United States Patent
Akula et al.

(10) Patent No.: US 9,413,750 B2
(45) Date of Patent: Aug. 9, 2016

(54) FACILITATING SINGLE SIGN-ON (SSO) ACROSS MULTIPLE BROWSER INSTANCE

(75) Inventors: Naga Sravani Akula, Prakasam Dist (IN); Vikas Pooven Chatoth, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 737 days.

(21) Appl. No.: 13/025,184

(22) Filed: Feb. 11, 2011

(65) Prior Publication Data
US 2012/0210413 A1  Aug. 16, 2012

(51) Int. Cl.
  *H04L 29/06* (2006.01)
  *H04L 29/08* (2006.01)

(52) U.S. Cl.
  CPC ............ *H04L 63/0815* (2013.01); *H04L 67/02* (2013.01); *H04L 63/168* (2013.01)

(58) Field of Classification Search
  USPC .................................................... 726/2–4, 8
  See application file for complete search history.

(56) References Cited

U.S. PATENT DOCUMENTS

| | | | | |
|---|---|---|---|---|
| 7,137,006 B1* | 11/2006 | Grandcolas | ............. | G06F 21/41 713/180 |
| 7,690,025 B2* | 3/2010 | Grewal et al. | ...................... | 726/8 |
| 8,117,314 B2* | 2/2012 | Croft | ..................... | G06F 3/1415 709/217 |
| 8,327,427 B2* | 12/2012 | Soukup et al. | ..................... | 726/8 |
| 8,413,210 B2* | 4/2013 | Kuzin | ..................... | G06F 21/41 726/2 |
| 2002/0184507 A1 | 12/2002 | Makower | | |
| 2003/0023880 A1* | 1/2003 | Edwards et al. | .............. | 713/201 |
| 2003/0105981 A1* | 6/2003 | Miller et al. | .................. | 713/202 |
| 2003/0182551 A1 | 9/2003 | Frantz | | |
| 2005/0193173 A1* | 9/2005 | Ring | ....................... | G06F 21/57 711/118 |
| 2006/0185004 A1* | 8/2006 | Song et al. | ......................... | 726/8 |
| 2006/0200559 A1 | 9/2006 | Ling | | |
| 2007/0039043 A1* | 2/2007 | Garskof | ............................ | 726/8 |
| 2007/0157304 A1* | 7/2007 | Logan | ..................... | H04L 67/02 726/12 |
| 2010/0250779 A1* | 9/2010 | B'Far | ....................... | G06F 21/10 709/246 |
| 2011/0061098 A1* | 3/2011 | Konya et al. | ....................... | 726/8 |
| 2011/0078437 A1* | 3/2011 | Reddy | .................. | H04L 63/0815 713/155 |
| 2011/0202989 A1* | 8/2011 | Otranen et al. | ..................... | 726/8 |
| 2011/0209210 A1* | 8/2011 | Miller | ..................... | G06F 21/41 726/8 |

(Continued)

OTHER PUBLICATIONS

Single Sign On (SSO) for cross-domain asp.net applications, Al-Farooque Shubho, Oct. 1, 2010, http://www.codeproject.com/Articles/106439/Single-Sign-On-SSO-for-cross-domain-ASP-NET-applic.*

(Continued)

*Primary Examiner* — Harris C Wang
(74) *Attorney, Agent, or Firm* — IPHorizons PLLC; Narendra Reddy Thappeta

(57) ABSTRACT

Facilitating single sign-on (SSO) across multiple browser instances such that user authentication at one browser instance is used as a basis to permit access to protected resources (hosted on server systems) from other browser instances. In an embodiment, the different browser instances are executing on different client systems. An authentication server may maintain a registration data indicating the different client systems/browser instances registered by a user for SSO feature. After a user is authenticated for a first session from one browser instance, the authentication server enables the user to access any protected resource from registered client systems/browser instances without requiring further authentication (based on the presence of the authenticated first session).

16 Claims, 7 Drawing Sheets

(56) References Cited

U.S. PATENT DOCUMENTS

2012/0210413 A1* 8/2012 Akula .............. H04L 63/0815
                                                    726/8
2012/0260321 A1* 10/2012 Wendt ............... H04L 9/0863
                                                    726/5

OTHER PUBLICATIONS

"Alexandre Alapetite", "Dynamic 2D-barcodes for multi-device Web session migration including mobile phones", Personal and Ubiquitous Computing vol. 14, No. 1, 45-52, DOI: 10.1007/s00779-009-0228-5, Apr. 2, 2009, p. 1-8.

"Chandershekarapuram Appadodharana", "Architecture Framework for Device Single Sign on in Personal Area Networks", OTM Confederated International Workshops, 2006, vol. 4278, ISBN 3-540-48269-5, pp. 1367-1379.

"Google Browser Sync", "Google Inc", http://www.google.com/tools/firefox/browsersync/, Downloaded Circa, Sep. 14, 2010, p. 1.

"Henry Song", "Browser Session Preservation and Migration", In Poster Session of WWW 2002, Hawaii, p. 1-2.

"Michael Adeyeye", "Mapping Third Party Call Control and Session Handoff in SIP Mobility to Content Sharing and Session Handoff in the Web", This paper appears in: Wireless Communications and Networking Conference, 2009. WCNC 2009. IEEE, Issue Date: Apr. 5-8, 2009, ISSN: 1525-3511, May 12, 2009, pp. 1-6.

"Michael Adeyeye", "A SIP-based Web Session Migration Service," in: Proceedings of 5th International Conference on Web Information Systems and Technologies (WEBIST) 2009, Mar. 23-26, 2009, pp. 1-6.

"Ming-Deng Hsieh", "Stateful session handoff for mobile WWW", Information Sciences: an International Journal, vol. 176: Issue 9, May 2006, ISSN:0020-0255, pp. 1241-0255.

"Mozilla Weaves", Mozilla, http://mozillalabs.com/sync/what-are-the-main-features-of-weave/, Downloaded circa, Sep. 14, 2010, pp. 1-3.

"Xmarks Features", "XmarkInc", http://www.xmarks.com/about/features/overview, Downloaded Circa, Sep. 14, 2010, p. 1.

* cited by examiner

FIG. 6A

| User ID | Browser Signature | Device Signature | Policies |
|---|---|---|---|
| john.abe | XXXX | AAAAA | P1 |
| susy.malt | YYYY | BBBBB | P2 |
| john.abe | XXXX | CCCCC | P1, P3 |
| susy.malt | XXXX | HHHHH | P2, P5 |
| john.abe | QQQQ | AAAAA | P1, P4 |

FIG. 6B

| User ID | Session ID | Session Type | Signature |
|---|---|---|---|
| john.abe | 1212 | global | XXXX-AAAAA |
| susy.malt | 2525 | global | YYYY-BBBBB |
| john.abe | 7474 | local | QQQQ-AAAAA |
| john.abe | 8080 | local | XXXX-CCCCC |

FACILITATING SINGLE SIGN-ON (SSO) ACROSS MULTIPLE BROWSER INSTANCE

BACKGROUND

1. Technical Field

The present disclosure relates to web technologies and more specifically to facilitating Single Sign-On (SSO) across multiple browser instances.

2. Related Art

Browser refers to an application, which when executed on a digital processing system, enables users to access various content (such as audio, video, text, data, etc.) on the Internet using standard protocols such as HTTP, as is well known in the relevant arts. The content is generally received from server systems (such as web servers) accessible via the Internet in the form of respective web pages, and presented (played, displayed, etc.) to users. Examples of browsers include Internet Explorer™, Firefox™, and Chrome™ applications.

Users are often required to be authenticated before a server system permits usage of applications and/or access to data (commonly referred to as protected resources), as is well known in the relevant arts. In a common approach, a user is required to provide a user identifier and a password combination (for example, in a web page displayed in the browser), and if the provided combination is an authorized combination, the user is deemed to be authenticated. However, additional information and/or other approaches (e.g., based on biometrics) can also be used for authentication.

SSO (single sign on) refers to an authentication feature where a single authentication permits the same user from the same/single client/user system, to thereafter access multiple protected resources (hosted on the same/different server systems). Without the SSO feature, the user may be required to provide the authentication information repeatedly for each of the protected resources/server systems sought to be accessed (using the browser).

SSO thus is a convenient feature for users to access protected resources and there is a general need to extend the convenience to other contexts.

BRIEF DESCRIPTION OF THE DRAWINGS

Example embodiments of the present invention are described with reference to the accompanying drawings briefly described below.

FIG. 6A depicts portions of registration data indicating which client systems are registered by which users in one embodiment.

FIG. 6B depicts portions of SSO session data maintained to facilitate SSO across multiple browser instances in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention facilitates single sign-on (SSO) across multiple browser instances such that user authentication at one browser instance is used as a basis to permit access to protected resources (hosted on server systems) from other browser instances.

In an embodiment, the different browser instances are executing on different client systems. An authentication server may maintain a registration data indicating the different client systems/browser instances registered by a user for SSO feature. After a user is authenticated for a first session from one browser instance, the authentication server enables the user to access any protected resource from registered client systems/browser instances without requiring further authentication (based on the presence of the authenticated first session).

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
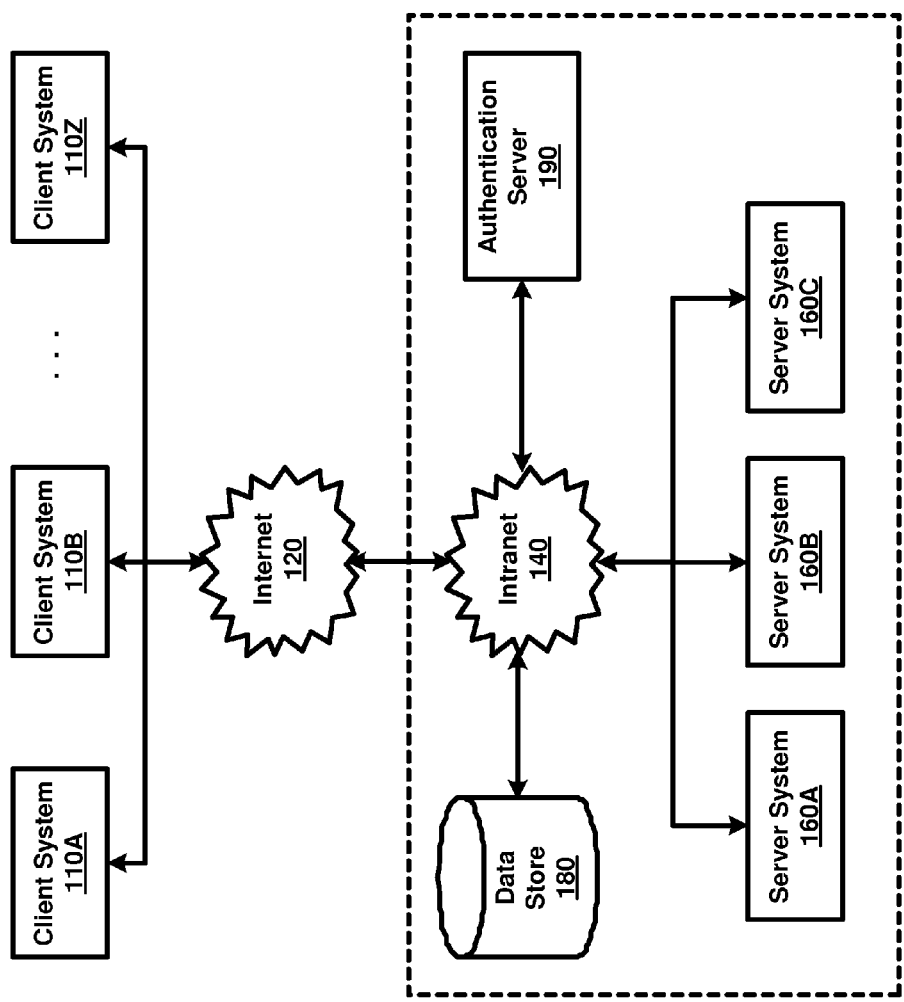
FIG. 1 is a block diagram illustrating an example environment (computing system) which can be extended using several aspects of the present invention.

FIG. 1 is a block diagram illustrating an example environment (computing system) which can be extended using several aspects of the present invention. The block diagram shows client systems 110A-110Z, Internet 120, intranet 140, server systems 160A-160C, data store 180 and authentication server 190.

Merely for illustration, only representative number/type of systems is shown in the Figure. Many environments often contain many more systems, both in number and type, depending on the purpose for which the environment is designed. Each block of FIG. 1 is described below in further detail.

Intranet 140 represents a network providing connectivity between server systems 160A-160C, data store 180, and authentication server 190, all provided within an enterprise or domain (shown with dotted boundaries). Internet 120 extends the connectivity of these (and other systems of the enterprise) with external systems such as client systems 110A-110Z. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by intranet 140 and Internet 120.

Data store 180 represents a non-volatile (persistent) storage facilitating storage and retrieval of a collection of data by applications executing in server systems 160A-160C (and also authentication server 190). Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

Each of client systems 110A-110Z represents a system such as a personal computer, workstation, mobile device, etc., used to access various resources (such as data and/or applications) provided within or external to the computing system of FIG. 1. The resources may be accessed based on HTTP requests generated by client applications, such as a browser, executing in the client system (in response to a user interaction). In response to sending the requests, the client system receives the corresponding web pages (or other suitable responses), as implemented in the corresponding environment. The web pages/responses may then be presented to the user by the client applications such as the browser.

Each of server systems 160A-160C represents a server, such as a web/application server, capable of hosting resources and thereafter providing access to the hosted resources to users (using client systems 110A-110Z). In general, each server system receives requests identifying (by a Uniform Resource Locator (URL)) the desired web pages and in response forms and sends the requested web pages to the requesting client system. The web pages may be either be static web pages that are retrieved from an internal or external (such as data store 180) storage or may be formed/created dynamically, where the content for the web pages are generated (e.g., by interfacing with applications executing in application servers) in response to the request, as is well known in the relevant arts.

It may be appreciated that some of the stored data forming part of the static web pages and/or applications that are executed for generation of the dynamic web pages may be indicated to be "protected" resources, i.e., requiring authentication prior to access. Each of server system 160A-160C may accordingly control the access of such protected resources based on authentication of the users (by interaction with authentication server 190, as described in below sections).

While the description herein is provided with respect to treating only applications as protected resources, several features of the present invention can be implemented in conjunction with other types of resources (e.g., specific parts of an application or specific data), the access to which is controlled by server system 160A-160C (similar to control of access to applications).

Authentication server 190 represents a system such as a server, which authenticates users attempting to access protected resources hosted on server systems 160A-160C. Once a user is authenticated, the user may access the protected resources, for example, using HTTP based web pages. Authentication server 190 may accordingly maintain the user information (e.g., user identifier-password combinations) required to authenticate each user, in addition to any information related to the server systems permitted to use such authentication feature. Such details may be stored on and retrieved from data store 180.

Thus, the systems within the "enterprise" of FIG. 1 operate together to enable users to access (and use) desired protected resources after successful authentication. The server systems 160A-160C and authentication server 190 may be implemented to support Single Sign-On (SSO) feature, to simplify the authentication process for the users. The SSO feature is illustrated in an example context below.

3. Single Sign-On (SSO)

Figure 2:
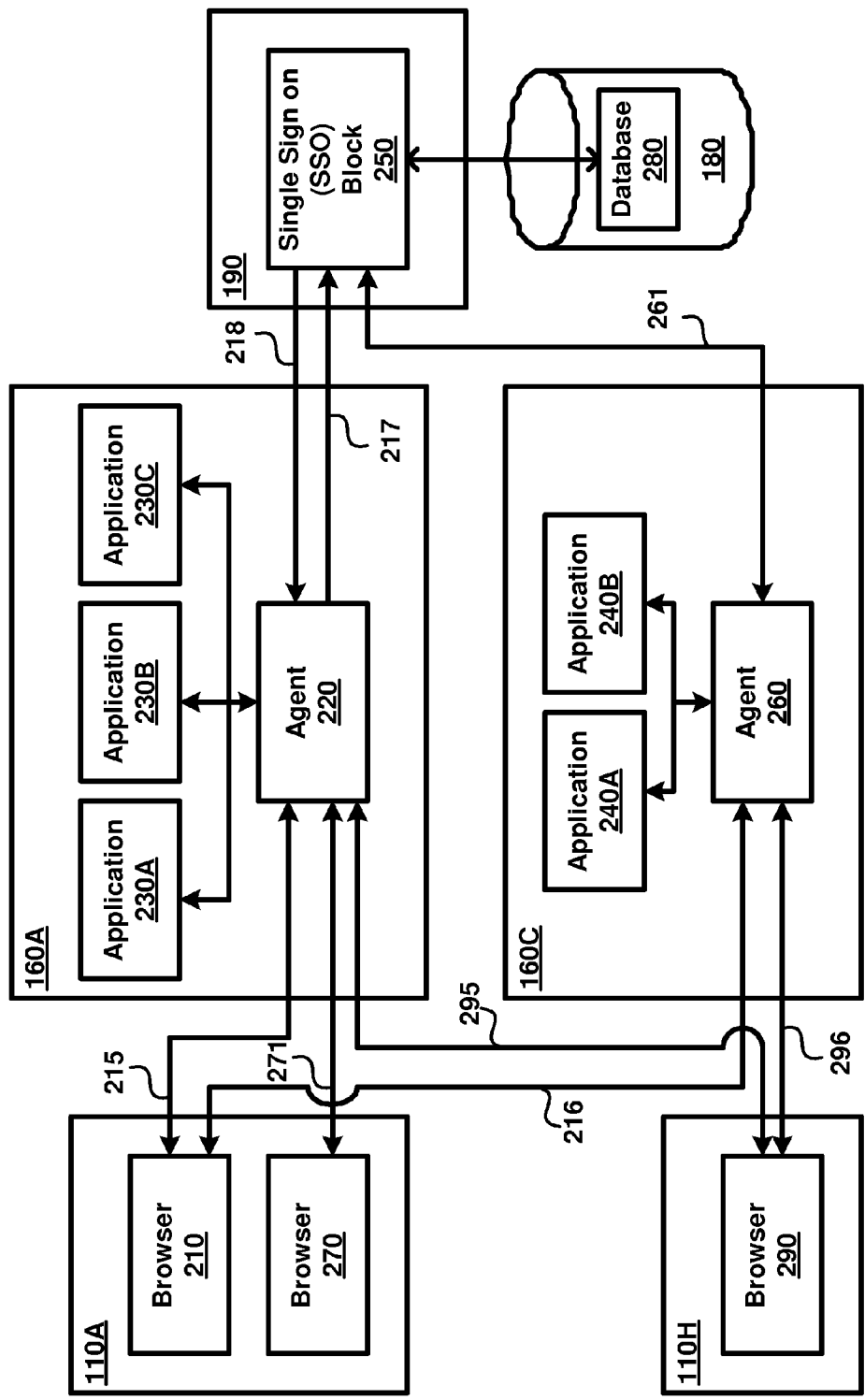
FIG. 2 is a logical view of an example environment/computing system used to illustrate implementation of SSO feature in one embodiment.

FIG. 2 is a logical view of an example environment/computing system used to illustrate implementation of SSO feature in one embodiment. Merely for illustration, the details of SSO are described with respect to the systems of FIG. 1, and only representative number/type of systems is shown in the Figure. Many environments often contain many more systems, both in number and type, depending on the purpose for which the environment is designed.

Each of server systems 160A and 160C is shown providing a corresponding set of user applications operating based on web pages. Each of the application blocks 230A-230C and 240A-240B implements a corresponding user application. In general, each application block contains the program logic to operate in conjunction with the corresponding agent (220/260) and provide various application features to the user and may be implemented in a known way.

In general, the user applications executing on the server systems are provided as part of a single domain, while providing disparate user functions accessible on the Internet. For example, a home page at google.com may allow a user to perform various tasks such as search for web pages, access email (Gmail), manage photos (Picassa), interact with others organized as social networks (Orkut), participate in various email groups (Google Groups), etc. Each of the tasks may be implemented as a corresponding user application (e.g., a search application, a Gmail application, a Picassa application, etc.) in the server systems (160A-160C) of the enterprise, though the tasks may be shown as being part of a single domain ("google").

It may be appreciated that some of the user applications may require authentication prior to being accessed. In the above noted example, accessing the Gmail application (protected resource) may require authentication of the user prior to access (to ensure that the emails of one user are not accessed by another user), while accessing the search application for searching web pages (unprotected resource) may not require authentication. The description is continued assuming that all of application blocks 230A-230C and 240A-240B are protected resources that require authentication prior to access.

Browser 210, shown executing in client system 110A, represents an instance of a browser (such as Internet Explorer, Chrome, etc.) used by a user to access the desired applications provided by the domain of FIG. 2. When a user attempts to access any of the applications for the first time or upon trying to expressly logon (e.g., by clicking on a hyperlink intended for logging on) as indicated by request 215, a web page is provided for receiving authentication information (e.g., user identifier and password).

After the user is authenticated based on the provided information, browser 210 receives and stores locally a (user) cookie, as an indication of successful authentication of the user. As is well known, cookies represent information stored at client/user systems (110A-110Z) by browsers for purposes such as maintaining user information, session information, etc. The reader is referred to RFC 2109 entitled, "HTTP State Management Mechanism", for further information on cookies.

In general, browser 210 is designed to maintain cookies corresponding to various domains accessed by the user, and to include the corresponding cookie in the header of requests sent to the systems in the same domain. For example, browser 210 may include the cookie stored after successful authentication in the header of request 216 sent to server systems 160C, since server systems 160A and 160C belong to the same domain. Browser 210 may determine the systems belonging to the same domain based on the URLs (for example, if the URLs contain the "google" text in the above noted example) of the web pages sought to be accessed on the different server systems.

Each of agents 220 and 260 receives requests for various web pages (identified by URLs) from browser 210 and serves/sends the requested web pages as corresponding responses. Prior to permitting access to some of the user applications, agents 220/260 may ensure that the user is authenticated (to access the specific resource being accessed). Protected resources may be indicated by appropriate configurations and the agents may examine the configuration data to determine whether a resource is protected or not.

In the scenario that a request for web page (of a user application) is received from an unauthenticated user, agents 220/260 redirect the request to authentication server 190. Redirection refers to having some other system (here authentication server 190) respond to a web page request, when the request is directed to a system (here, server systems 160A/160C). The absence of authentication for a protected resource may be determined based on absence of cookie information with the request or invalid cookie (e.g., expired cookie, cookie content does not cover the resource sought to be accessed or incorrect cookie data otherwise).

Authentication server 190 authenticates each user based on authentication information received from the users. In an embodiment, SSO block 250 receives redirects from agent 220/260 (e.g., on path 217) when web page requests are received from unauthenticated users, and sends a web page (also specified in the redirected message) for a user at browser 210 to be able to enter authentication information such as a user identifier and password combination. The received combination is compared with the combinations in database 280 to authenticate the user. The information in the database may further indicate various user attributes (e.g., complete user name, user specific configurations, etc.), which are also retrieved and sent along with confirmation of successful authentication to agent 220/260 (e.g. on path 218).

In an embodiment, the authentication confirmation message is received in the form of a string, containing the URL of the requested resource and parameters including authentication result, and the user name, in encrypted form. Other information such as time stamp, lifetime of the authentication (validity duration), the resources/domains the authentication is valid for, etc., may also be included in the message.

Thus, upon successful authentication by SSO block 250, agent 220/260 receives the confirmation message and then forms a user cookie, which is encrypted form of information received from authentication server 190. In addition, the user cookie may include (in encrypted form) the IP address of the client system for which the cookie is intended, the expiration date of the cookie, time stamp representing the current time at which the cookie is created, any session identifier, authentication level (identifying the class/set of resources the user is permitted to access), etc. The user cookie containing the encrypted information is then sent to browser 210.

It may be appreciated that the decryption of the cookie may require a corresponding decryption key, and accordingly each of agents 220 and 260 may be designed to operate with a common decryption key. In one embodiment, a common encryption/decryption key combination for encryption/decryption of the cookie information is generated for the domain and distributed to the various server systems (providing access to user applications/protected resources). The distribution of the common keys may be performed by authentication server 190.

Web page requests (such as 216) from the same browser (210) to access same or different applications are thereafter received along with the user cookie sent earlier. If the cookie is successfully decrypted, the request is deemed to be from an authenticated user. Accordingly, agents 220 and 260 operate in conjunction with the corresponding application (determined usually based on the URL in the received request) to generate the next web page. Some of the content in the decrypted cookie may potentially be provided to the application for further use.

Thus, the server systems 160A-160C and authentication server 190 operate together to provides access to several/all users applications in the domain, thereby providing the Single-Sign-On feature to access applications on all the server systems in the same domain based on single authentication (and user cookies).

4. Need For Facilitating SSO From Multiple Browser Instances

It may be desirable that the same user be facilitated to access the protected resources from multiple systems/machines. For example, a user may wish to access the protected resources from both an Office system and a Home system using only a single authentication. Alternatively, a user may wish to access the protected resources from various mobile devices (such as laptops, tablets, cell phones, etc.) using a single authentication. The user may wish to avoid multiple authentications particularly when using devices that do not have a complete keyboard (e.g., QWERTY keyboard).

It may be appreciated that the SSO process described above with respect to FIG. 2 fails (that is, a user is necessitated to perform multiple authentications) when the same user attempts to access the user applications from different devices/systems. For example, after providing the single authentication as described above using browser 210 (executing in client system 110A), when the user uses browser 290 (executing in client system 110H) to send requests (on paths 295 and 296) for accessing user applications executing on server systems 160A and 160C, it may be appreciated that such requests do not include the user cookie (which was earlier stored by browser 210 in client system 110A) corresponding to the domain.

Agents 220/260 accordingly identify the requests received from browser 290 as being from an unauthenticated user due to the absence of the user cookie in the requests. Agents 220/260 may accordingly redirect the requests to authentication server 190, which in turn may send the webpage for providing the user identifier and password combination to the user. The same user is accordingly required to provide multiple authentications, contrary to the SSO feature sought to be provided.

There are also several situations in which SSO feature fails even when the accesses are from a single client system 110A. For example, when a user uses instances of different browsers (such as Internet Explorer application and Chrome application) to access the protected resources or when the user uses multiple instances of the same browser (for example, multiple instances of Internet Explorer application providing corresponding separate user interfaces/windows), the SSO feature is noticed to fail. Thus in FIG. 2, when browser 210 is an instance of Internet Explorer and browser 270 is an instance of Chrome or when both browsers 210 and 270 are different instances of Internet Explorer providing corresponding separate user interfaces/windows, the SSO process may fail.

Such failure is generally due to the non-sharing of the user cookies between the different instances of the same/different browsers. Accordingly, requests (e.g. on path 271) sent by the other browser (270) executing in the same client system do not contain the cookie corresponding to the domain (which is maintained by browser 210). The requests are accordingly identified (by agents 220/260) as being from unauthenticated users (due to the lack of the cookie) and authentication server 190 forces the user to provide authentication again.

Thus, it may be desirable to facilitate SSO across multiple browser instances (either executing in the same or different systems). SSO block 250, extended according to several aspects of the present invention, facilitates SSO from multiple browser instances as described below with examples. Though the below description is related to facilitating SSO feature across multiple different systems/devices, it may be appreciated that the features of the present invention may be implemented for multiple browser instances executing in the same system as well, as will be apparent to one skilled in the relevant arts by reading the disclosure herein.

5. Facilitating SSO From Multiple Systems

Figure 3:
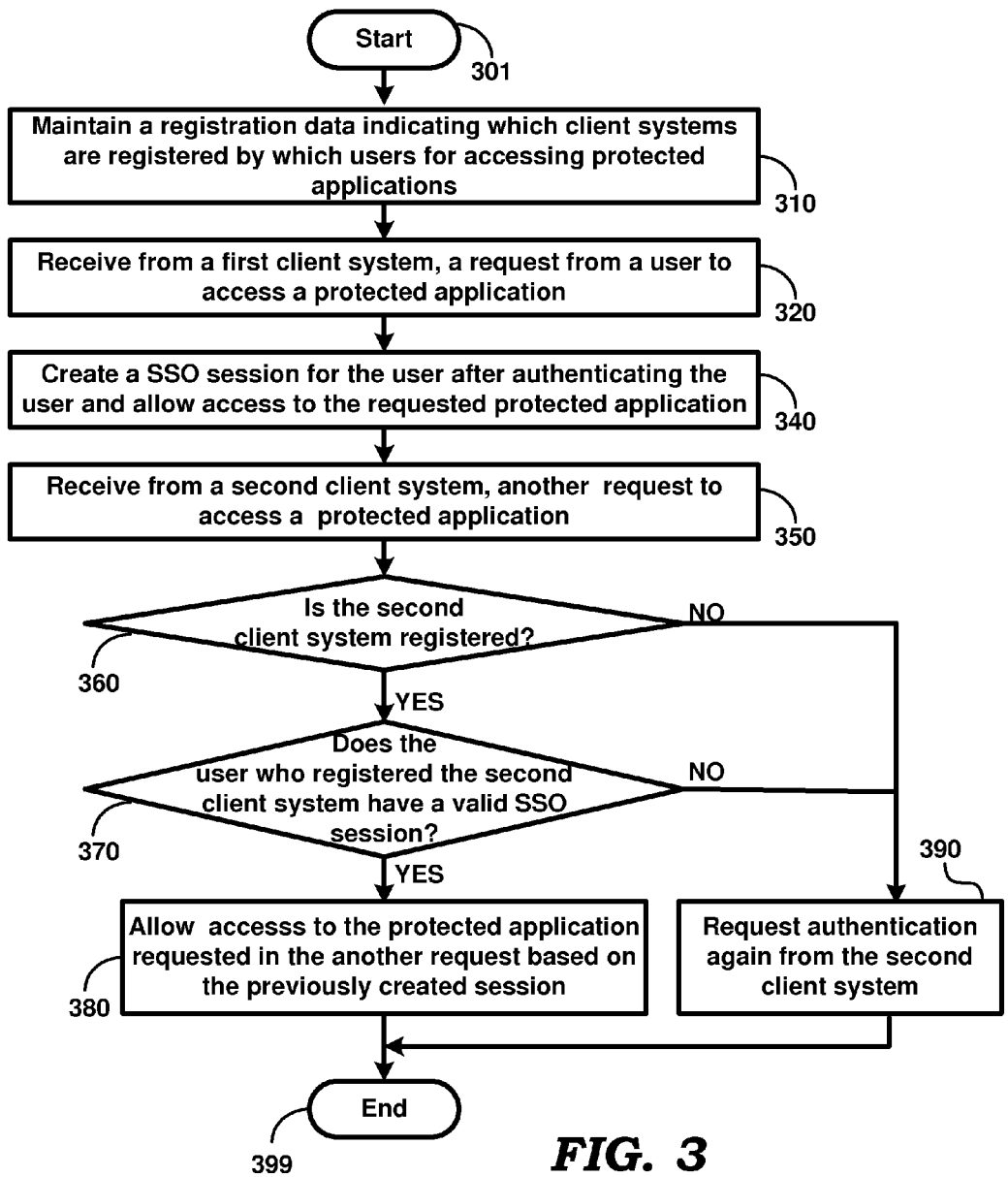
FIG. 3 is a flow chart illustrating the manner in which SSO feature from multiple systems is facilitated according to an aspect of the present invention.

FIG. 3 is a flow chart illustrating the manner in which SSO feature from multiple systems is facilitated according to an aspect of the present invention. The flowchart is described with respect to FIGS. 1 and 2 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, SSO block 250 maintains a registration data indicating which clients systems are registered by which users for accessing protected applications (in general, protected resources). It should be understood that the registered set of client systems are typically different for different users. The registration data can be configured by an administrator or (as described below) be provided by the corresponding users. The registration data may be stored in a non-volatile storage within authentication server 190 or in an externally storage (such as data store 180).

In step 320, SSO block 250 receives from a first client system, a request from a user to access a protected application. For example, the request may be received on path 217 after being redirected by agent 220, in response to receiving the request on path 215 from browser 210 (executing in client system 110A) and agent 220 identifying that the request is from an unauthenticated (or not yet authenticated) user.

In step 340, SSO block 250 creates a (SSO) session for the user after authenticating the user and allows access to the requested (in step 320) protected application. The authentication may be performed by sending a web page to the user at the browser, receiving a user identifier and password combination, and confirming that the received combination matches an authorized combination present in database 280. It should be understood that the SSO session is used to merely keep track of the authenticated users at authentication server 190, and is thus distinct from the user/application sessions commonly created between browsers and server systems (160A-160C) for exchange of related data packets.

After the SSO session is successfully created, SSO block 250 sends an authentication confirmation message to the corresponding agent (executing in server systems 160A-160C) which redirected the request of step 320. The agent (220/260) may then form a user cookie based on the authentication confirmation message and send the user cookie to a browser instance executing in the first client system. The browser instance may include the user cookie in later requests, thereby enabling the user to access other protected applications provided in the same domain.

In step 350, SSO block 250 receives from a second client system (different from the first client system), another request to access a (same or different from that in step 320) protected application hosted on server systems in the same domain. For example, the request may be received on path 261 after being redirected by agent 260, in response to receiving the request on path 296 from browser 290 (executing in client system 110H) and agent 290 identifying that the request is from an unauthenticated (or not yet authenticated) user. Alternatively the request may correspond to the request received on path 217 after being redirected by agent 220, in response to receiving the request on path 295 from browser 290

In step 360, SSO block 250 identifies whether the second client system is registered (for some user) according to the registration data (maintained in step 310). The registration data/list indicates the corresponding set of client systems registered by users, and accordingly, the client system may be identified as being not registered only if the client system is not included in any of the sets. Any techniques/information may be employed to uniquely identify each client system. For example, any combination of one or more of the MAC address (e.g, Ethernet address assuming the local area network is based on IEEE 802.3 standard) and IP address (assuming a static IP addressing scheme is employed) may be employed to uniquely identify each client system. Control passes to step 370 if the second client system is identified as being already registered and to step 390 otherwise.

In step 370, SSO block 250 determines whether the user who registered the second client system has a valid SSO session (in other words, whether the user has been already been authenticated, and a current SSO session has been created). Thus, if the user sending the request from the first client system had already registered the second client system, the user is determined to have a valid SSO session (created in step 340). However, if the second client system is registered to a different user (who has not yet authenticated and not created a SSO session), the determination of step 370 fails.

In one embodiment, SSO block 250 is designed to maintain a SSO session data indicating the SSO sessions created for the authenticated users, and accordingly the determination is performed by inspecting the SSO session data to check whether a current SSO session exists for the user. Thus, control passes to step 380 only if the user who registered second client system has already been authenticated (and a SSO session created when accessing protected applications from another client system) and to step 390 otherwise.

In step 380, SSO block 250 allows access to the requested (in step 350) protected application based on the previously created SSO session (based on an assumption that the same user has sent the request of step 350 as well). In other words, the same user is not required to re-authenticate again for accessing the requested protected application in view of the same user having registered the second client system in the registration data. Thus, by populating the registration data/list (for a given user) with a (corresponding) desired set of client systems, SSO feature can be extended across all such systems for that user. Control passes to step 399, where the flow chart ends.

In one embodiment described below, users are enabled to specify various policies to be associated with the client system used for accessing protected resources. A policy may specify constraints on the number/type/particulars of protected applications that can be accessed from a specific client system, the time duration during which the access can be performed from a client system, the maximum number of client systems that can be provided the SSO feature simultaneously, whether accessing using a first client system would result in a second client system from being removed from the SSO feature (thereby requiring the user to provide authentication again when accessing from the second client system), etc. Some of the policies may also be specified by an administrator of the domain, for example, for specifying constraints on the number of connections, network bandwidth in total/per user, etc.

SSO block 250 accordingly allows a user to access the requested protected applications/resources from a specific client system (and browser instance) only when the all of the corresponding policies associated with browser instance/client system can be validated (that is, the constraints in the policies are satisfied). Thus, if the user is determined to have a valid SSO session in step 370, control passes to step 380 only when the all the associated policies for the user/client system can be validated and to step 390 (requiring the user to authenticate again) otherwise.

Column 624 "Policies" specifies the various policies (noted as P1, P2, P3, etc., which may correspond to above noted examples) that are to be applied and validated, when the corresponding user attempts to access protected applications from the corresponding combination of browser instance and client system. A user is allowed to access protected applications only when the all of the corresponding policies specific in column 624 can be validated (or otherwise implemented/satisfied).

In step 390, SSO block 250 requests authentication again from the second client system. In other words, due to the absence of the client system in the registration data/list, the user (whether same or different from the one of step 320) is required to authenticate again (thereby not providing the SSO feature). The authentication may be performed similar to step 340. Control passes to step 399, where the flow chart ends.

It may be appreciated that the flow of FIG. 3 (where step 340 is shown as being performed in response to the request of step 320) is generally performed when the user attempts to access any of the applications for the first time (e.g., when the user accesses the home page of the domain) or when the user is trying to expressly logon (e.g., by clicking on a hyperlink intended for logging on, or accessing a login page of the domain). In a typical implementation, step 340 is performed similar to step 390 (that is after the checks of steps 360 and 370 have been performed). In other words, step 340 is performed only when the first client system is not registered and/or when there is no prior SSO session for the user (even if the first client system is registered by the user).

Thus, by repeatedly performing steps 350, 360, 370, and 380 for requests received from other client systems (other than the first client system, which may send later requests containing the user cookie created in step 340), a (same) user is enabled to access protected applications from multiple systems/devices using a single authentication (in step 340). Thus, SSO is facilitated across multiple systems.

The description is continued with respect to the manner in which registration of different client systems is performed by users in one embodiment.

6. Registering Multiple Systems

Figure 4:
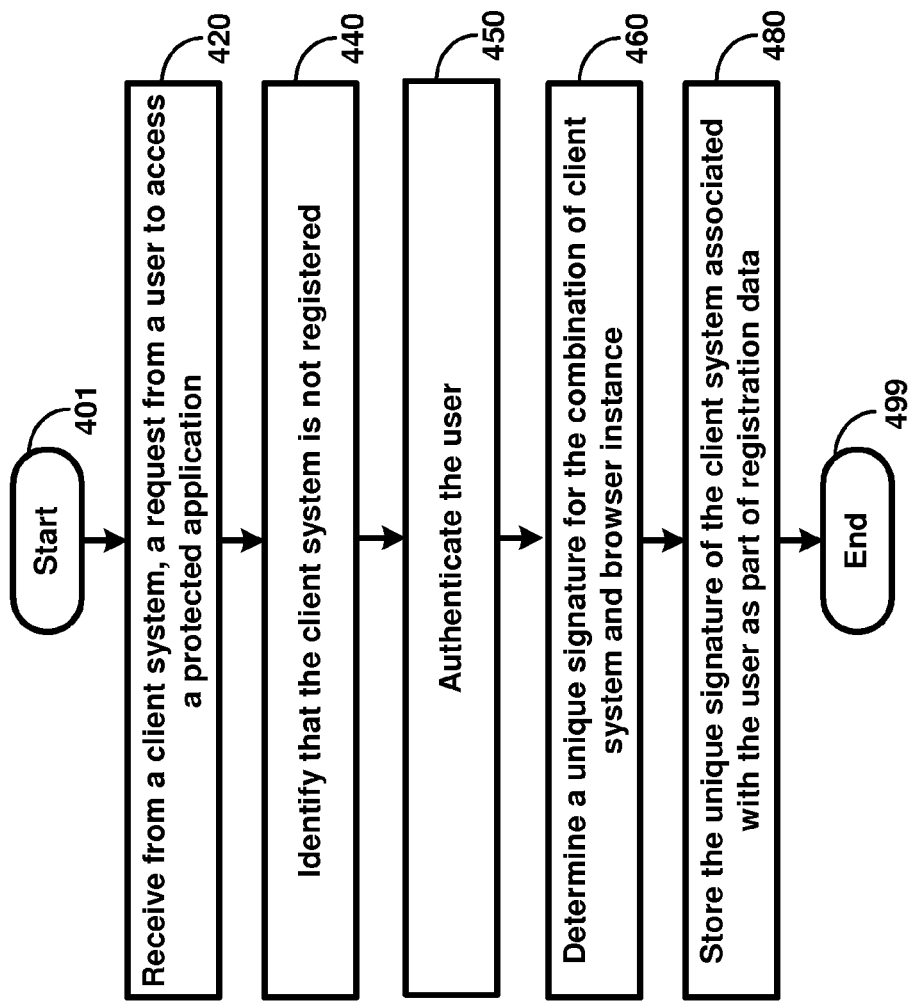
FIG. 4 is a flow chart illustrating the manner in which a user is enabled to register multiple systems across which SSO feature is sought to be facilitated according to an aspect of the present invention.

FIG. 4 is a flow chart illustrating the manner in which a user is enabled to register multiple systems across which SSO feature is sought to be facilitated according to an aspect of the present invention. The flowchart is described with respect to FIGS. 1 and 2 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 401, in which control immediately passes to step 420.

In step 420, SSO block 250 receives from a client system, a request from a user to access a protected application. The request may be received similar to one of the requests received in steps 320 and 350, that is, from either client system 110A or client system 110H. In general, the request can be received from any of client systems 110A-110Z, after being redirected by the corresponding agent executing in a server system in the domain, in response to the agent receiving the request from the client system and identifying that the request is from an unauthenticated user.

In step 440, SSO block 250 identifies that the client system is not registered based on registration data/list (maintained by SSO block 250 as described above with respect to step 310). The identification may be performed similar to step 360 of FIG. 3.

In step 450, SSO block 250 authenticates the user as described above with respect to steps 340 and 390. An SSO session may also be created upon successful authentication. The user may also be enabled to specify whether the browser instance/client system used for accessing the protected application is to be registered (to facilitate SSO feature). In one embodiment, the user is provided a registration option (e.g., in the form of a check box, a list of options, etc.) in the web page used for entering authentication information, with the user selecting the registration option if the user wishes to register. The additional tasks required for registration of the client system for the user are described with respect to the remaining steps of the FIG. 4.

In step 460, SSO block 250 determines a unique signature for the combination of the client system and the specific browser instance executing in the client system (using which the user generated the request of step 420). Such a unique signature enables SSO block 250 to identify whether a client system is already registered when additional requests are processed in accordance with steps 360 and 440. The determination may be performed in response to the user indicating that the specific browser instance/client system is sought to be registered (for example, in response to the user selecting the registration option).

In general, the unique signature may be viewed as having a browser signature formed from the details of the browser instance, and a device signature formed from the details of the client system/device (from which the request is received). It may be appreciated that the browser signature may be determined based on the browser details received as part of the request, while the device signature may be determined by further interacting (sending requests and receiving responses) with the requesting client system. In one embodiment, the web page used to provide authentication information is designed to generate the browser and device signatures in response to the user indication and to send the generated signatures along with the authentication information to SSO block 250.

In step 480, SSO block 250 stores the unique signature of the client system associated with the user as part of registration data. As noted above, the unique signature and the user association may be maintained in an internal storage (within authentication server 190) or in an external storage such as data store 180. The flow chart ends in step 499.

A user may similarly perform the step of FIG. 4 for registering each of the client systems (across which SSO is sought to be facilitated) with authentication server 190. Accordingly, the user is enabled to access protected applications of a domain from different registered client systems using a single authentication, as described above with respect to FIG. 3. The manner in which the steps of FIGS. 3 and 4 may be implemented is described below with examples.

7. Illustrative Example

Figure 5:
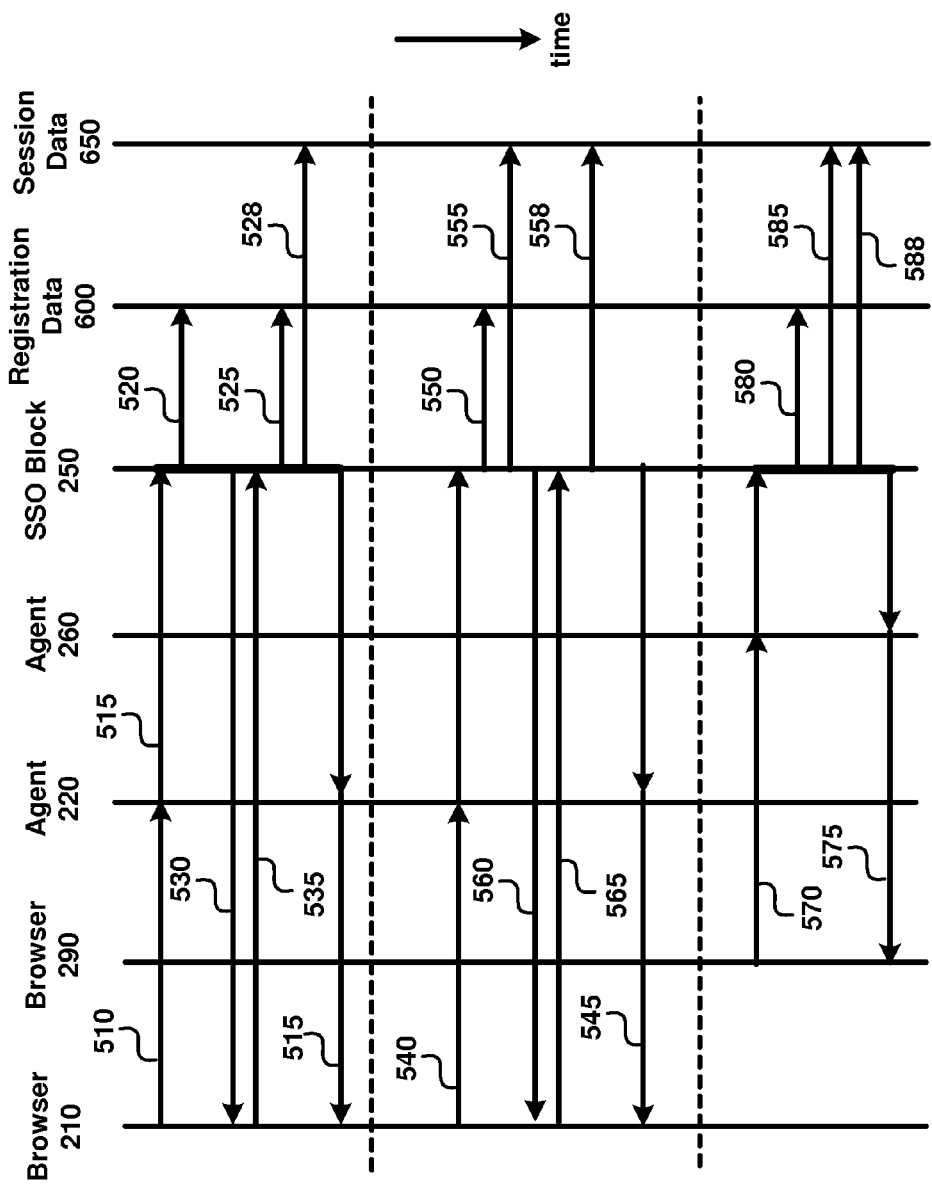
FIG. 5 is a sequence diagram illustrating the manner in which SSO across multiple browser instances is facilitated in one embodiment.

FIGS. 5 and 6A-6B together illustrate the manner in which the environment of FIG. 2 is extended to facilitate SSO across multiple browser instances in one embodiment. Each of the Figures is described in detail below.

FIG. 5 is a sequence diagram illustrating the manner in which SSO across multiple browser instances is facilitated in one embodiment. Broadly, steps 510 through 515 illustrate the manner in which a user is enabled to register a browser instance (210), steps 540 through 545 illustrate the manner in which a user accesses protected applications for the first time, and step 570 through 575 illustrate the manner in which the (same) user subsequently accesses the (same/different) protected applications.

Thus, in step 510, a user using browser 210 (executing in client system 110A) is shown sending a request for accessing a protected application (e.g. one of application blocks 230A-230C) to agent 220 executing in server system 160A, which then redirects (515) the request to SSO block 250 as the user is identified to be an unauthenticated (or not yet authenticated) user. SSO block 250 then determines a unique signature (based on a browser signature and a device signature) for the combination of browser 210 and client system 110A, as described below.

In one embodiment, the browser signature includes information such as browser version, name, operating system, User-Agent (received as a part of User agent header in the client request), accepted file types (in HTTP Accept header field), the locale and language (in HTTPAccept-Language header field), the supported encoding types (in HTTPAccept-Encoding header field), supported character set (in HTTPAccept-Charset header field). The device signature includes information retrieved from various system related fields accessible from within the browser such as Audio/video disabled, Has video encoder, Debug version, Dots-per-inch (DPI), Embedded video, Flash™ Version, Has audio encoder, Has MP3, Has accessibility, Has audio, Has input method editor (IME) installed, Is local file read disabled, Is screen color, Language, Manufacturer, Operating System, Player type, Screen resolution, Supports native, SSL, Supports playback on screen broadcast applications, Supports printer, Supports screen broadcast applications, Supports streaming audio, Supports streaming video, etc.

As noted above, the unique signature may be generated in response to a user indication (selection of the registration option) that the specific browser instance (210) and client system (110A) is sought to be registered. The browser signature may be generated based on the header information in the received access request, while the device signature may be retrieved, for example, using a Flash Object embedded in the web page used for providing authentication information or by sending additional web pages (and receiving corresponding responses) from the SSO block 250 to the specific requesting client system (110A). The Flash Object may be designed to retrieve various system related fields noted above, that can be used by SSO block 250 as a basis for generating device signature. The unique signature may then be formed/used based on the browser and device signatures, as described below.

In one embodiment, the unique signature is generated (by SSO block 250) and stored as a general cookie (not related to the user cookie described above). The signature can be generated to be unique for each browser instance or client system, and stored in the general cookie and as an entry in the registration data (table 600 described below). It should be appreciated that such a unique value can be generated based on the browser signature, device signature and any additional data that may be required to make the value unique. As is well known in the relevant arts, such a general cookie is later included by browser 210 in all requests sent thereafter to any server system of the same domain. Accordingly, the unique signature can be used to determine whether the requesting client system is already registered or not.

Alternatively, in a scenario that the browser and device signature together can uniquely identify each client system, the unique signatures may be generated dynamically each time an unauthenticated user tries to access a protected application. The description is continued assuming that the unique signatures are dynamically generated by SSO block 250 for each access request.

SSO block 250 then checks whether the determined unique signature is already present in the registration data (step 520), to identify whether client system 110A is already registered (if the signature is present) or not. On determining that client system 110A is not registered (signature is absent), SSO block 250 performs authentication of the user as indicated by steps 530 (providing a web page) and 535 (receiving a user identifier and password combination from the user).

After successful authentication of the user (using data maintained in data store 180, not shown), SSO block 250 stores the unique signature of client system 110A associated with the user identifier (step 525) in table 600 (described below), creates a SSO session for the user (step 528) in table 650 (described below), and then allows access to the requested protected application to the user (step 515).

Thus, a user is enabled to register a client system (and a browser) with SSO block 250, and also allowed to access protected applications. The (same) user may similarly register the combination of client system 110H (and browser 290) with SSO block 250. SSO block 250, may accordingly maintain a registration data indicating which client systems are registered by which users, as described below with examples.

FIG. 6A depicts portions of registration data (table 600) indicating which client systems are registered by which users in one embodiment. Column 621 "User ID" specifies the user identifier which uniquely identifies each user accessing the protected applications, while columns 622 and 623 respectively specifies the signatures of the browser instance and the client system that is registered by the user. Column 624 "Policies" specifies the various policies (e.g., P1, P2, P3, etc.) that are to be applied and validated, when the corresponding user attempts to access protected applications from the corresponding combination of browser instance and client system. A user is allowed to access protected applications only when the all of the corresponding policies specific in column 624 can be validated.

Each of rows 641-645 indicates an association between a user and a corresponding browser/client system combination, and may be created in step 525 after the user is successfully authenticated from a different system. Thus, rows 641 and 643 and 645 indicate that the user "john.abe" has registered three different browser/device combinations with authentication server 190. In other words, the user "john.abe" wishes to access the protected applications from three different browser instances (but only two different client systems, as the device signature is the same in rows 641 and 645). Rows 642 and 644 indicate that the user "susy.malt" has registered two browser/device combinations, and accordingly wishes to access from two different browser instances/client systems.

The description is continued assuming that the user "john.abe" has registered browser 210 and client system 110A with the unique signature XXXX-AAAAA (row 641) and another browser 290 and client system 110H with the unique signature XXXX-CCCCC (row 643). Row 643 also indicates that the user "john.abe" is to be allowed to access protected applications/resources using browser 290 and client systems 110H only if policies P1 and P3 can be validated.

Referring again to FIG. 5, steps 540 through 545 illustrate the manner in which a user accesses protected applications for the first time. Thus, in step 540, SSO block 250 is shown receiving a new request (that is, without any user cookie) from browser 210. The new request is shown redirected by agent 220, as the request is identified to be from an unauthenticated user (due to the absence of the user cookie).

SSO block 250 then determines a unique signature (XXXX-AAAAA) for the combination of browser 210 and client system 110A. On checking with the registration data of table 600 (step 550), SSO block 250 identifies that the signature is present in row 641 and the combination has been registered by the user "john.abe" and then checks in the SSO session data of table 650 whether there exists a valid/currently authenticated SSO session of the user "john.abe" (step 555). On determining that no prior valid SSO session exists (that is, the user "john.abe" has not yet authenticated), SSO block 250 performs authentication of the user (steps 560 and 565), creates a new SSO session for the user "john.abe" in table 650 (step 558), and allows access to the requested protected applications (step 545).

Thus, a user is required to provide authentication when accessing for the first time (consistent with SSO feature). Other users may similarly provide authentication when accessing for the first time, and SSO block 250 accordingly may maintain a SSO session data specifying a list of currently authenticated users, as described below with examples.

FIG. 6B depicts portions of SSO session data (table 650) maintained to facilitate SSO across multiple browser instances in one embodiment. Column 661 "User ID" specifies the user identifier which uniquely identifies each user accessing the protected applications, while columns 662 and 663 respectively specifies the identifier and type of SSO session created for the user and column 664 specifies the unique signature of the browser/client system for which the session was created (that is, from where the user provided authentication).

A session created for the first time (such as in step 528 or 558) is indicated as a "global" session type, while subsequent sessions created based on a "global" session (such as in step 588 described below) are indicated as "local" session type. It should be appreciated that a "global" session type also contains the local session of that particular first device/client, as well as all later local sessions related to that user.

In an embodiment, global sessions are permitted only from certain class of computers (e.g., the user's primary computer at work place or home) based on the policies configured, and the entry/row for that session is removed from session data of table 650 when the user logs off from the computer from which the global session is setup. Policy configuration may be flexible enough to configure logout as a global logout or a client system specific logout. When a corresponding global session is absent for a user in the session data (table 650), the user may be required to provide authentication information again.

Each of rows 681-684 indicates a SSO session created by SSO block 250 in response to the user providing authentication (global session) or when the system from which the (same) user is accessing is registered and a prior global session already exists (local session). Thus, rows 681 and 682 respectively indicate the corresponding global sessions created (in steps 528 or 558) in response to the users "john.abe" and "susy.malt" providing authentication for the first time (either steps 530/535 or 560/565). The description is continued assuming that only rows 681-682 are currently present in table 650.

Referring again to FIG. 5, step 570 through 575 illustrates the manner in which the (same) user subsequently accesses the (same/different) protected applications. Thus, in step 570, the (same) user using browser 290 (executing in client system 110H) is shown sending a request for accessing a protected application (e.g. one of application blocks 240A-240B) to agent 260 executing in server system 160C, which then redirects the request to SSO block 250 as the user is identified to be an unauthenticated user (due to the absence of the user cookie).

SSO block 250 then determines a unique signature (XXXX-CCCCC) for the combination of browser 290 and client system 110H. On checking with the registration data of table 600 (step 580), SSO block 250 identifies that the signature is present in row 643 and the combination has been registered by the user "john.abe" and then checks in the SSO session data of table 650 whether there exists a SSO session of the user "john.abe" (step 585). On determining that a prior SSO session does exist in row 681 (that is, the user "john.abe" has already authenticated), SSO block 250 creates a new local SSO session for the user as shown in row 683 (step 588), and allows access to the requested protected applications (step 575). Thus, the user "john.abe" is not required to provide authentication again, when the client system is already registered and the user is already authenticated, thereby facilitating SSO across multiple client systems.

It may be appreciated that the above process may be extended to different browser instances (of either the same browser or different browsers) executing in the same client system. For example, the user "john.abe" may register another browser 270 executing in the same client system 110A, and accordingly SSO block 250 may add row 645 to the registration data of table 600. It may be observed that the browser signatures "XXXX" and "QQQQQ" are different in rows 641 and 645, while the device signature "AAAAA" are the same in both rows 641 and 645 (indicating that the accesses are from the same client system).

When the user "john.abe" uses browser 270 (executing in client system 110H) to access protected applications, SSO block 250 may match the unique signature with that present in row 645 and accordingly create a new local session (assuming that the global session of the user in 681 is already created) for the user (as shown in row 684), and allows access to the protected applications from browser 270 without requiring further authentications. Thus, SSO block 250 facilitates SSO across multiple browser instances as well.

It should be further appreciated that the features described above can be implemented in various embodiments as a desired combination of one or more of hardware, executable modules, and firmware. The description is continued with respect to an embodiment in which various features are operative when the instructions in the executable modules are executed.

8. Digital Processing System

Figure 7:
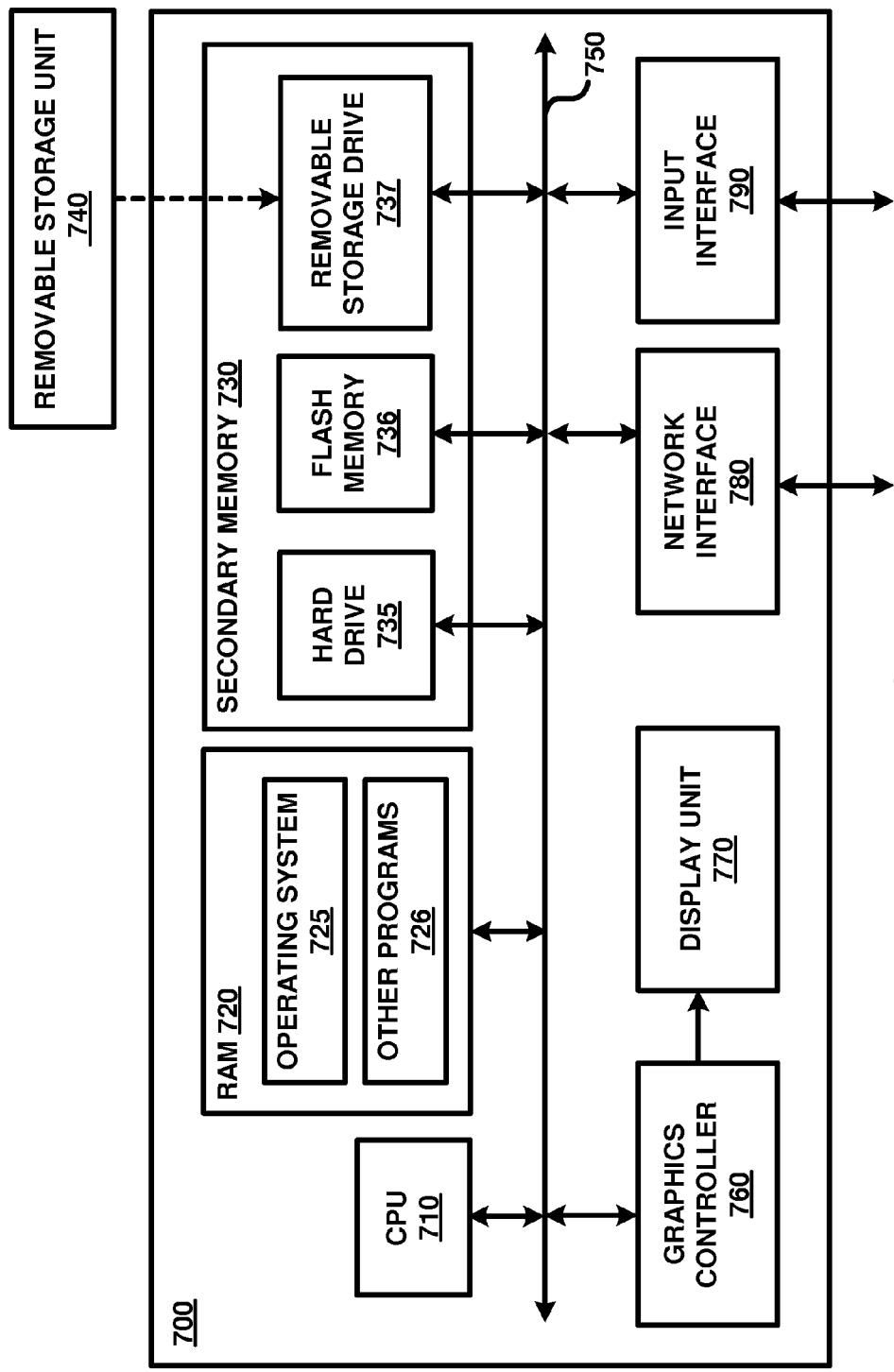
FIG. 7 is a block diagram illustrating the details of a digital processing system in which several aspects of the present invention are operative by execution of appropriate software instructions.

FIG. 7 is a block diagram illustrating the details of digital processing system 700 in which several aspects of the present invention are operative by execution of appropriate software instructions. Digital processing system 700 corresponds to authentication server 490 or any other system executing SSO block 250.

Digital processing system 700 may contain one or more processors (such as a central processing unit (CPU) 710), random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or user programs 726 (such as networking applications, database applications, etc.). Shared environment 725 contains utilities shared by user programs, and such shared utilities include operating system, device drivers, virtual machines, flow engine, etc., which provide a (common) run time environment for execution of user programs/applications.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse). Network interface 780 provides connectivity to a network (e.g., using Internet Protocol), and may be used to communicate with other connected systems (such as server systems 160A-160C or client systems 110A-110Z).

Secondary memory 730 may contain hard drive 735, flash memory 736, and removable storage drive 737. Secondary memory 730 represents a non-transitory medium, which may store the data (for example, portions of registration data of FIG. 6A and SSO session data of FIG. 6B) and software instructions (for example, for performing the steps of FIGS. 3, 4 and, 5), to enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computing system comprising:
an authentication server to authenticate users and to maintain registration data indicating a respective set of client systems registered for each user across which a single sign-on (SSO) is to be facilitated; and a plurality of server systems to host a plurality of protected resources, which are accessible only to authenticated users, each server system to receive a request for accessing a protected resource of said plurality of protected resources and if the request is identified as not being from an authenticated user, redirecting the received request to said authentication server for authentication of the user by said authentication server;

a plurality of client systems using which users send requests for accessing said plurality of protected resources to said plurality of server systems, wherein said registration data at a first time instance indicates that a first set of client systems is registered for a single user, said first set of client systems being contained in said plurality of client systems, said registration data indicating that said first set of client systems includes a second client system, wherein said single user sends from a first client system, a first request for accessing a first protected resource and then sends from said second client system, a second request for accessing a second protected resource, wherein said first request is sent at a second time instance following said first time instance, wherein said first protected resource and said second protected resource are contained in said plurality of protected resources, wherein said first client system is contained in said plurality of client systems, wherein said authentication server performs a single authentication of said single user in response to receiving said first request from said first client system, wherein said single user is allowed to access from said first client system, said first protected resource in a session duration after said single authentication, wherein a single sign on (SSO) session is maintained in said authentication server in said session duration as a basis for permitting access to at least some of said plurality of protected resources including said first protected resource, wherein said authentication server and said plurality of server systems operate to allow said single user to access said second protected resource in said session duration from said second client system, based on said single authentication from said first client system in view of said second client system being included in said first set of client systems registered for said single user such that said single user is not required to perform authentication again to access from said second client system, said second protected resource in said session duration.

2. The computing system of claim 1, wherein said single user sends said first request, provides authentication information for said single authentication and accesses said first protected resource from a first browser instance executing in said first client system, wherein said single user sends said request and accesses said second protected resource from a second browser instance executing in said second client system without being required to provide authentication information again.

3. The computing system of claim 2, wherein said authentication server also maintains a session data, wherein said session data indicates present sessions operative for a set of already authenticated users such that said session data indicates that said single user is authenticated in said session duration, wherein access to said second protected resource from said second client system is allowed based on the presence of said second client system in said first set of client systems in said registration data and said user being indicated to have a present session in said session data during said session duration.

4. The computing system of claim 3, wherein said registration data further indicates a respective set of policies to be checked before allowing access from each of the client systems registered for a user, wherein said registration data indicates that a first set of policies is to be checked before allowing access from said second client system registered for said single user, wherein access to said second protected resource from said second client system is allowed only when said first set of policies are checked and determined to be validated.

5. The computing system of claim 3, wherein each of said plurality of client systems indicated in said registration data is identified using a corresponding unique signature, wherein presence of said second client system in said first set of client systems is determined based on matching of the unique identifier of said second client system in said registration data.

6. The computing system of claim 5, wherein the unique signature of a client system comprises a browser signature corresponding to the browser instance used to send the request to access protected requests and a device signature corresponding to the client system.

7. A method of facilitating single sign-on (SSO) across multiple client systems when accessing a plurality of protected resources, wherein said plurality of protected resources are accessible only to users authenticated by an authentication server, said method being performed in said authentication server, said method comprising:

maintaining a registration data indicating which ones of a plurality of client systems are registered for which ones of a plurality of users for accessing said plurality of protected resources, wherein said registration data at a first time instance indicates that a first set of client systems is registered for a first user of said plurality of users, said first set of client systems being contained in said plurality of client systems, said registration data indicating that said first set of client systems includes a second client system;

receiving, from a first client system, a first request from said first user to access a first protected resource of said plurality of protected resources, said first client system being contained in said plurality of client systems, wherein said first request is sent at a second time instance following said first time instance;

authenticating said first user upon receipt of said first request and maintaining a single sign on (SSO) session in a session duration in which said first user is permitted to access said plurality of protected resources based on said authenticating;

allowing access to said first protected resource from said first client system after said authentication of said first user;

receiving, from said second client system, a second request to access a second protected resource of said plurality of protected resource;

determining whether said second client system is included in said first set of client systems registered for said first user based on said registration data; and allowing access to said second protected resource from said second client system based on said authentication of said first user with respect to accessing of said first protected resource if said second request is received in said session duration and said determining determines that said second client system is included in said first set of client systems, wherein said first user is not required to perform authentication again to access said plurality of protected resources from different client systems, including said second client system, based on said authentication performed from said first client system in said session duration.

8. The method of claim 7, wherein said registration data further indicates a respective set of policies to be checked before allowing access from each of the client system registered for a user, wherein said registration data indicates that a first set of policies is to be checked before allowing access from said second client system registered for said first user, wherein said allowing allows access to said second protected resource from said second client system only when said first set of policies are checked and determined to be validated.

9. The method of claim 8, wherein each of said plurality of client systems indicated in said registration data is identified using a corresponding unique signature, wherein said determining determines the presence of said second client system in said first set of client systems based on matching of the unique identifier of said second client system in said registration data.

10. The method of claim 9, wherein the unique signature of a client system comprises a browser signature corresponding to the browser instance used to send the request to access protected requests and a device signature corresponding to the client system.

11. A non-transitory machine readable medium storing one or more sequences of instructions for causing an authentication server to facilitate single sign-on (SSO) across multiple client systems when accessing protected resources, wherein each protected resource is accessible only to users authenticated by said authentication server, wherein execution of said one or more sequences of instructions by one or more processors contained in said authentication server causes said authentication server to perform the actions of:

maintaining a registration data indicating a respective set of client systems registered for each user across which single sign-on (SSO) is to be facilitated, wherein said registration data at a first time instance indicates that a first set of client systems is registered for a first user, said registration data indicating that said first set of client systems includes a second client system;

receiving, from a first client system, a first request from said first user to access a first protected resource, wherein said first request is sent at a second time instance following said first time instance;

authenticating said first user at said first client system based on an authentication information received from said first client system;

maintaining a single sign on (SSO) session in a session duration in which said user is permitted to access said protected resources based on said authenticating;

allowing access to said first protected resource from said first client system after said authenticating of said first user in said session duration;

receiving, from said second client system, a second request from said first user to access a second protected resource;

determining whether said second client system is included in said first set of client systems registered for said first user based on said registration data; and allowing access to said second protected resource from said second client system based on said authenticating of said first user at said first client system if said second request is received in said session duration and said determining determines that said second client system is included in said first set of client systems, wherein said first user is enabled to access the protected resources from different client systems, without said first user having to authenticate again, in view of said authentication information provided from said first client system in said session duration.

12. The machine readable medium of claim 11, further comprising one or more instructions for:

creating a global session in said authentication server for said first user based on said authentication, wherein said global session is maintained in said authentication server in said session duration; and checking, in response to said second request after said determining, whether said global session for said first user exists in said authentication server, wherein said allowing allows access to said second protected resource from said second client system if said checking determines that said global session exists in said authentication server.

13. The machine readable medium of claim 12, further comprising one or more instructions for creating a local session in said authentication server for said first user when accessing said second protected resource from said second client system.

14. The machine readable medium of claim 11, wherein said registration data further indicates a respective set of policies to be checked before allowing access from each of the client system registered for a user, wherein said registration data indicates that a first set of policies is to be checked before allowing access from said second client system registered for said first user, wherein said allowing allows access to said second protected resource from said second client system only when said first set of policies are checked and determined to be validated.

15. The machine readable medium of claim 14, wherein each of the client systems indicated in said registration data is identified using a corresponding unique signature, wherein said determining determines whether said second client system is included in said first set of client systems based on matching of the unique identifier of said second client system in said registration data.

16. The machine readable medium of claim 15, wherein the unique signature of a client system comprises a browser signature corresponding to a browser instance used to send the request to access protected requests and a device signature corresponding to the client system.

* * * * *